United States Patent
Lieder et al.

(10) Patent No.: US 7,162,028 B2
(45) Date of Patent: Jan. 9, 2007

(54) UNIVERSAL TELEPHONY INTERFACE POLARITY DETECTOR

(75) Inventors: John Lieder, Scotch Plains, NJ (US); Ken Lau, Parsippany, NJ (US)

(73) Assignee: Intel Corporation, Santa Clara, CA (US)

(*) Notice: Subject to any disclaimer, the term of this patent is extended or adjusted under 35 U.S.C. 154(b) by 1005 days.

(21) Appl. No.: 09/996,255

(22) Filed: Nov. 28, 2001

(65) Prior Publication Data
US 2003/0043998 A1 Mar. 6, 2003

Related U.S. Application Data

(60) Provisional application No. 60/315,797, filed on Aug. 29, 2001.

(51) Int. Cl.
*H04M 1/00* (2006.01)

(52) U.S. Cl. .................. 379/399.01; 379/377

(58) Field of Classification Search ............... 379/382
See application file for complete search history.

(56) References Cited

U.S. PATENT DOCUMENTS

| | | | | |
|---|---|---|---|---|
| 4,540,853 A | * | 9/1985 | Albouy | 379/378 |
| 5,987,120 A | * | 11/1999 | Hwang et al. | 379/382 |
| 6,590,973 B1 | * | 7/2003 | Bijman et al. | 379/377 |

* cited by examiner

*Primary Examiner*—Sinh Tran
*Assistant Examiner*—Walter F Briney, III
(74) *Attorney, Agent, or Firm*—Grossman, Tucker, Perreault & Pfleger, PLLC

(57) ABSTRACT

A method and apparatus for measuring signals conveyed by a varying the voltage polarity across the tip and ring terminals in a telephone system is disclosed. The invention provides a composite circuit including a first stage in the form of a differential amplifier, a second stage in the form of a low pass filter, and a third stage in the form of a Schmidt trigger. The invention is capable of discerning an intentional polarity reversal telephony signal by eliminating transmission noise, as well as false triggering due to a high frequency (relative to a defined threshold) ring signal.

15 Claims, 2 Drawing Sheets

UNIVERSAL TELEPHONY INTERFACE POLARITY DETECTOR

RELATED APPLICATION

This is a conversion of provisional patent application No. 60/315,797 filed Aug. 29, 2001.

TECHNICAL FIELD

This invention relates to telephony, and more particularly, to an improved technique for detecting the polarity of a voltage present across a set of telephone wires in both the on-hook and off-hook states.

BACKGROUND OF THE INVENTION

In telephony, line polarity reversal is used as a method of call status signaling in analog telephony interfaces. This event is used primarily to frame the beginning and ending of a telephone communication transaction, in order to prevent call collisions, known as a glare condition, in automated telephony equipment. Essentially, line polarity reversal is used to signal the receiving telephone that a call is coming in. In other countries around the world polarity reversals are used to signal a variety of telephony events.

Another application of polarity reversal involves what is known as caller identification or caller ID. In a caller ID system, the telephone number of the calling party is transmitted to the called telephone and displayed on a screen prior to the called telephone being answered. A polarity reversal can thus provide an indication that caller ID information is forth coming.

Conventional implementations of on-hook polarity detection use current bleed resistors or opto-couplers to sense the polarity. The bleed resistor solution decreases the input impedance (generally undesirable) and is also subject to noise problems. The opto-coupler solution involves an E-O-E conversion; i.e., comprises a first converter that transforms an electrical current into a light signal, and a second converter that changes the light signal back into an electrical current. Such an electric-optic-electric conversion process draws significant current to turn on. While this is tolerable in certain countries where impedance limitation requirements have been relaxed specifically for this type of circuitry, these circuits cannot meet the requirements of more stringent countries. Accordingly, using the existing state of the art methods, one cannot build a universal telephony interface polarity detector, which is capable of meeting the requirements of all countries, whether the current bleed resistor or the opto-coupler system is employed.

In view of the widespread use of polarity modulation (i.e., the varying of the polarity of a voltage across the tip and ring inputs to a telephone line) to transmit data to telephone receiving equipment, a need exists in the art for an improved technique of accurately detecting the polarity of a voltage, and more importantly, a shift in said polarity, across telephone equipment. Preferably, such an improved technique would allow an input impedance that is high enough to satisfy the impedance limitation requirements of all countries, including those with the most stringent standards. Such a technique would also preferably be impervious to noise problems, and operable down to a relatively low voltage.

DETAILED DESCRIPTION OF THE PREFERRED EMBODIMENT

Figure 1:
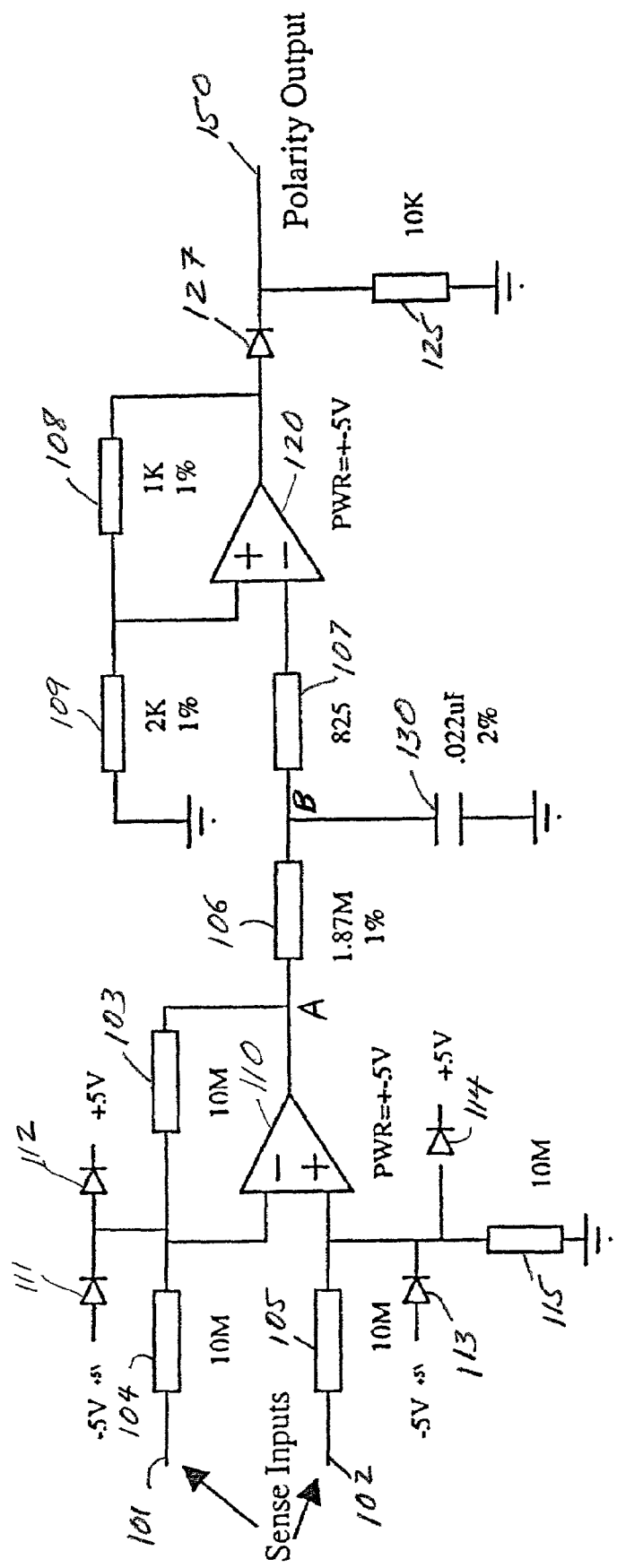
FIG. 1 is a portion of a circuit diagram for use in practicing the present invention.

FIG. 1 shows a portion of a circuit diagram for use in practicing the present invention. The arrangement of FIG. 1 includes only the portion of circuitry that detects a differential voltage between inputs 101 and 102 corresponding to the tip and ring inputs to a standard telephonic device.

As can be readily determined from FIG. 1, the circuit diagram presented consists of three stages. The first stage, extending from inputs 101 and 102 to node A, comprises a differential amplifier. Inputs 101 and 102 represent the tip and ring signals entering a standard telephonic device. Each of these inputs 101 and 102 is connected respectively to a high impedance input resistor 104 and 105. From there, the input signals are connected respectively to the inverting and non-inverting terminals of an operational amplifier (op amp) 110. The op amp 110 has a predetermined open loop gain, but, as depicted in FIG. 1, there is a feedback loop to the inverting input terminal through gain resistor 103. This configuration allows the closed loop gain to be directly proportional to the ratio of gain resistors 103 to 104 and 105. Resistors 103, 104 and 105 can be set as desired by the particular application of a given user, however according to the preferred embodiment the closed loop gain is small and the impedance of each of the sense inputs is sufficiently high so as to meet the impedance limitation requirements of the most stringent countries' telephone systems. A pair of diodes 111 and 112 is connected to the junction between resistors 103 and 104 to provide overvoltage protection to the op amp 110.

As well, diodes 111 and 112 are connected in such a manner so as to limit the op amp input voltage to no more than 0.3 volts above the positive power rail voltage and no more than 0.3 volts below the negative power rail voltage applied to op amp 110. The switching speeds of diodes 111 and 112 are preferably fast.

Sense input 102 is fed into resistor 105, the output from which connects to the non-inverting terminal of op amp 110. An additional connection from the non-inverting terminal of operational amplifier 110 leads through resistor 115 to ground, connecting to a pair of diodes 113 and 114 in mid-path. The combination of diodes 113 and 114 provides overvoltage protection to op amp 110. All diodes in the system 111–114 are preferably fast switching diodes to provide transient voltage protection.

The first stage of the invention circuit is completed at node A in FIG. 1. At node A the output voltage will be equal to the ratio of closed loop gain resistors 103 and 104 multiplied by the differential voltage between the tip and ring inputs 101 and 102, respectively. In the illustrated example, resistors 103, 104, 105, and 115 each have a value of 10 MΩ. For purposes of simplicity, in the following discussion it will be assumed that the closed loop gain is in fact unity and that stage 1 functions essentially as an amplifier with a gain of 1 and a high input impedance, and that is output voltage limiting. The resulting response of output voltage as a function of input voltage for the first stage in the circuit of FIG. 1 is plotted in FIG. 2A, and shows a transfer function of unity gain. Changes in the values of various components in the circuit of FIG. 1 will obviously result in a different response curve.

The second stage of the circuit depicted in FIG. 1 begins at node A and terminates at node B. The second stage circuit segment is essentially an RC network functioning as an analog low pass filter. The low pass filter operates here as a false detection filter. The RC network comprises resistor 106 and grounded capacitor 130, connected to one another at node B. The values of resistor 106 and capacitor 130 are chosen such that all signals detected at or above a minimum frequency will be filtered out. The reason for this second stage is simple. During a ring signal, the polarity across the tip and ring terminals necessarily oscillates. Such polarity reversals are not the ones used for signaling that the present invention is designed to detect, and as such they must be discarded. The values of resistor 106 and capacitor 130 can thus be chosen by the user as desired to comply with this functionality. In the example disclosed herein, resistor 106 is set at 1.87 M$\Omega$ and capacitor 130 is 0.022 µF, thus forming an analog low pass filter with a time constant of RC=0.04114 seconds. The resulting low pass filter thus has a 3-dB frequency of approximately 3.86 Hz. As an example, one can choose the resistor 106 and capacitor 130 such that the pass band of the analog frequency filter is in the range from 0 to 7 Hz. In a telephonic system where the lowest ring frequency is 15 Hz this choice of pass band is satisfactory.

The third stage of the circuit depicted in FIG. 1 begins at node B and ends at the polarity output 150. The third stage is essentially a Schmidt trigger, or an analog bi-stable multivibrator. As will be described in more detail below, the bi-stable multivibrator has two stable states representing the high and low voltages, limited only by the saturation of op amp 120. Accordingly, the output of the third stage of the circuit of FIG. 1 will be approximately 5 volts (or ground) where op amp 120 is powered by +/−5 volt power rails.

The third stage of the circuit of the invention operates as follows. The effect of a voltage at the non-inverting terminal of op amp 120 depends on the previous state of its output, depicted as polarity output 150 in FIG. 1. If a shift in polarity occurs and continues long enough to charge capacitor 130 in stage 2 of the circuit, and if the voltage is of an amplitude large enough to shift stage 3 into its other stable state, then the polarity output 150 will also be reversed. If the polarity remains the same, then polarity output 150 will simply remain constant. The output at 150 is monitored by a microprocessor (not shown) that is programmed to register signal polarity at 10 ms intervals.

In the third stage of the circuit, beginning at node B, resistor 107 is connected in series to the inverting terminal of operational amplifier 120. The non-inverting terminal of op amp 120 connects through resistor 109 to ground. Resistor 108 forms a positive feedback loop between op amp 120 output and the non-inverting input thereof. The output of op amp 120 also connects through diode 127 to the polarity output 150 and through resistor 125 to ground. According to the preferred embodiment, resistor 107 is 825$\Omega$, resistor 108 is 1 K$\Omega$, resistor 109 is 2 K$\Omega$ and resistor 125 is 10 K$\Omega$. Diode 127 preferably fires at less than one volt. Op amp 120 is powered with voltage rails of +/−5V.

In view of the above-described operation of the circuit of the present invention, there is a polarity output 150, which takes one of two possible states. There is a high state and a low state, each corresponding to the maximum high of op amp 120 in saturation or a low, determined by pull-down resistor 125. Thus there is essentially a digital polarity indicator taking either a high or a low state, which rejects false triggering due to ring voltage-induced polarity inversions, and has a sufficiently broad dead band to prevent unwanted transitions in the event that battery voltage drops, the line is disconnected, or the loop current drops. Because the circuit presents a very high input impedance, the circuit can meet the requirements of virtually all international PSTN country requirements.

The circuit is set so as to reject polarity reversals of less than 33.33 ms duration—corresponding to a half cycle of a minimum ring frequency of 15 Hz. Design considerations and alternative ring frequency conventions will dictate variation from this value as may be necessary in other embodiments. As well, the circuit is set so as to reject polarity reversals, even if of sufficient duration, if the filtered voltage does not reach at least ⅔ of the opposite Vsat. In the circuit, where the Vsat range is +/−5V, the voltage at point B in FIG. 1 must reach at least 3.33V in the opposite direction in order for a polarity reversal to be registered as same and change the polarity output 150 of the circuit.

Figure 2A:
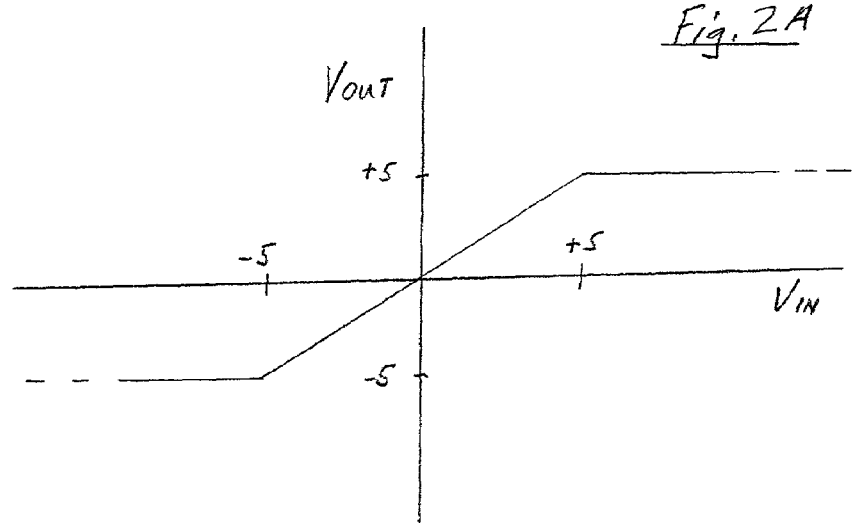
FIG. 2A is a plot of the output voltage verses the differential input voltage for the first stage of the circuit presented in FIG. 1.
Figure 2B:
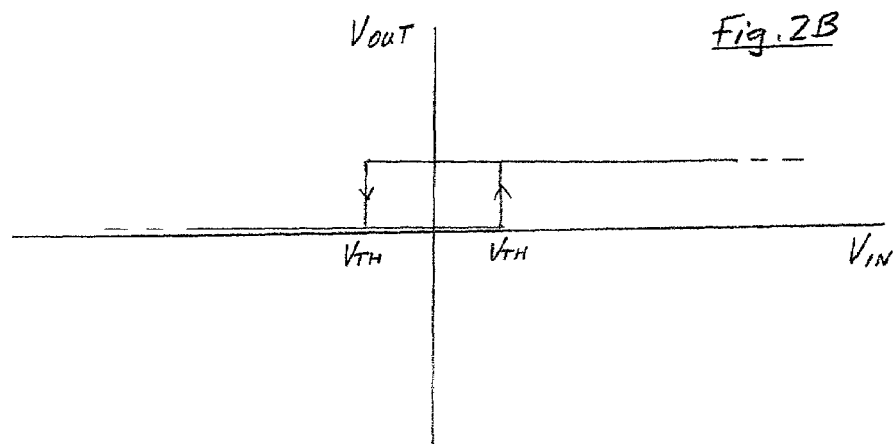
FIG. 2B a depiction of the output voltage verses input voltage of the third stage of the circuit depicted in FIG. 1.
Figure 2C:
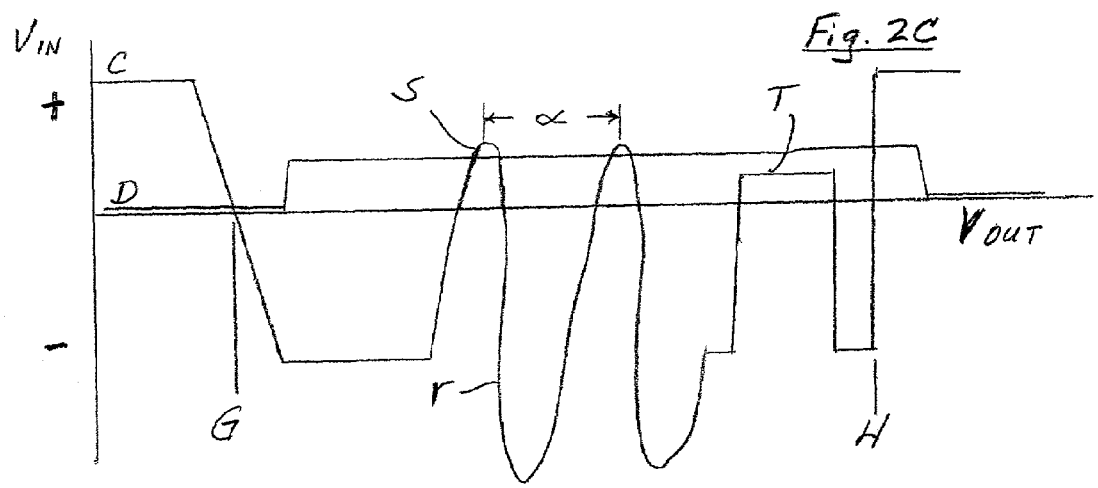
FIG. 2C is a plot of the overall polarity output verses the differential input of the circuit depicted in FIG. 1.

FIG. 2A graphically illustrates the output voltage from the first stage of the described circuit as a function of differential input voltage. As shown, the voltage curve goes from a −5V input differential voltage and −5V output voltage to a +5V input differential voltage and +5V output voltage along a substantially straight slope. FIG. 2B shows the third stage output voltage 150 in response to the hysteresis effect of the Schmidt trigger. The Schmidt trigger causes the output voltage to remain at its supply value until reaching a triggering differential at $V_{TH}$ voltage threshold (+ or −) and then change to its new output value precipitously. FIG. 2C provides a plot of input sense voltage across terminals 101 and 102 (see FIG. 1) and a plot of output voltage at polarity output terminal 150. Plot C is the Vin signal, and Plot D the Vout signal. These two voltages are plotted versus time; thus the x-axis represents time in FIG. 2C, while the y-axis represents voltage, and the plots C and D are superimposed in the figure.

The input voltage C changes polarity definitively at locations G and H on FIG. 2C, with the undulating voltage of a ring signal R not considered by the system. In parallel with, and slightly delayed from the illustrated polarity changes, the output voltage 150 is shown as (plot D in FIG. 2C) increasing from approximately zero volts to a positive value and falling back to zero thereafter.

As described, according to the preferred embodiment circuit described above, the false detection filter of stage 2 and the Schmidt trigger of stage 3 operate together to eliminate voltage polarity transitions of less than 67 ms duration caused by the maximum ring voltage at a minimum ring frequency of 15 Hz and a minimum DC battery voltage. The full pulse cycle a of ring signal r coordinates with the filter limit of 67 ms: actually the value is 66⅔ (or 66.67 in decimal notation) for a safety factor of double, since one-half the 15 Hz cycle will have a duration of 33.33 ms. Other time thresholds (due to varying ring conventions, or a lesser desired safety margin) that are longer or shorter than 67 ms may be selected by varied system design, especially in the choice of component values in the Stage 2 resistor 106 and capacitor 130 with reference to FIG. 1.

Thus, as depicted in FIG. 2C, the circuit of the preferred embodiment operates to eliminate both (i) voltage spikes S with a maximum value greater than the minimum voltage and a duration of less than 67 ms, as well as (ii) polarity crossovers T having lower than the minimum voltage yet extending longer than the 67 ms time bar. As seen in FIG. 2C, neither voltage spikes S of short duration and high voltage nor polarity crossovers such as T, having long duration and low voltage, are interpreted by the circuit as a valid polarity reversal. The circuit only permits a polarity reversal that exceeds both the desired voltage and temporal minima to be registered.

Besides the ability to detect the polarity of the tip/ring pair of a loop start interface in the on-hook condition, the circuit of the present invention is capable of detecting the direction of loop current flow in an off-hook condition. The circuit thus provides a reliable call collision avoidance mechanism and also provides off-hook polarity sense.

While the foregoing describes the preferred embodiment of the invention, it will be appreciated by those of skill in the art that various modifications and additions may be made. Such modifications would include replacing the circuit components at each stage with functionally equivalent apparatus, as well as combining various stages or the entire circuit on a single integrated circuit. Such additions and modifications are intended to be covered by the following claims.

What is claimed is:

1. A circuit for detecting a reversal in polarity, comprising:
   a differential amplifier;
   a low pass filter connected in series with the amplifier; and
   a Schmidt trigger connected in series with the low pass filter.

2. The circuit of claim 1, wherein the differential amplifier comprises an operational amplifier having a feedback loop from an output terminal thereof to an inverting input terminal thereof.

3. The circuit of claim 1, wherein the Schmidt trigger comprises an operational amplifier having a feedback loop from an output terminal thereof to a non-inverting input terminal thereof.

4. A method for detecting a polarity reversal in a telephony circuit comprising:
   providing a differential input voltage across the inputs of a differential amplifier;
   providing a low pass filter connected to an output of the differential amplifier;
   providing a Schmidt trigger connected to an output of the low pass filter; and
   determining polarity stasis or reversal based upon an output of the Schmidt trigger.

5. The method of claim 4, wherein the step of providing a differential input voltage across a differential amplifier comprises providing said voltage across an operational amplifier having a feedback loop from an output terminal thereof to an inverting input terminal thereof.

6. The method of claim 4, wherein the step of providing a Schmidt trigger comprises providing an operational amplifier having a feedback loop from an output terminal thereof to a non-inverting input terminal thereof.

7. The method of claim 4, further comprising eliminating voltage polarity transitions that are shorter than a defined time.

8. A method for detecting a polarity reversal in a telephony circuit comprising:
   comparing the relative voltage of two inputs;
   filtering out a polarity reversal that lasts shorter than a defined time; and
   filtering out polarity reversals where the final relative voltage is below a defined threshold.

9. The method of claim 8, where the defined time is such so as to filter out any polarity reversal induced by an incoming ring signal.

10. The method of claim 8, where the defined threshold is such so as to filter out any polarity reversal caused by any of battery voltage drops, line disconnections, or loop current drops.

11. An apparatus for detecting a reversal in polarity, comprising:
    a comparator;
    a low pass filter connected to an output of the comparator; and
    a hysteresis element connected to an output of the low pass filter.

12. The apparatus of claim 11, wherein the hysteresis element comprises a Schmidt trigger.

13. The apparatus of claim 11, where the low pass filter is designed to filter out any polarity reversal induced by an incoming ring signal.

14. The apparatus of claim 11 where the hysteresis element is such so as to filter out any polarity reversal caused by any of battery voltage drops, line disconnections, or loop current drops.

15. The apparatus of claim 13 where the hysteresis element is such so as to filter out any polarity reversal caused by any of battery voltage drops, line disconnections, or loop current drops.

* * * * *